US009107060B2

(12) United States Patent
Bull

(10) Patent No.: US 9,107,060 B2
(45) Date of Patent: Aug. 11, 2015

(54) TEXTING DRIVER ALERT SERVICE

(71) Applicant: HTI IP, LLC, Atlanta, GA (US)

(72) Inventor: Randall Bull, Acworth, GA (US)

(73) Assignee: HTI IP, LLC, Atlanta, GA (US)

( * ) Notice: Subject to any disclaimer, the term of this patent is extended or adjusted under 35 U.S.C. 154(b) by 0 days.

(21) Appl. No.: 14/080,900

(22) Filed: Nov. 15, 2013

(65) Prior Publication Data

US 2015/0140953 A1 May 21, 2015

(51) Int. Cl.
*H04M 11/04* (2006.01)
*H04M 11/00* (2006.01)
*H04M 3/42* (2006.01)
*H04W 4/00* (2009.01)
*G06Q 99/00* (2006.01)
*H04W 4/22* (2009.01)
*H04W 4/02* (2009.01)

(52) U.S. Cl.
CPC . *H04W 4/22* (2013.01); *H04W 4/02* (2013.01)

(58) Field of Classification Search
CPC .......... H04W 68/00; H04W 4/14; H04M 3/42
See application file for complete search history.

(56) References Cited

U.S. PATENT DOCUMENTS

2012/0289217 A1* 11/2012 Riemer et al. ................. 455/418
2012/0303392 A1* 11/2012 Depura et al. .................... 705/4

* cited by examiner

*Primary Examiner* — Thomas Lett

(57) ABSTRACT

A network device receives an indication of a text message sent from a sender via a mobile device and receives multiple telematics packets from a vehicle telematics unit. Each of the multiple telematics packets includes operating data from a vehicle, associated with a driver and a time or time interval. The network device identifies the sender as the driver based on information from the text message indication, identifies a sending time of the text message based on the text message indication, and identifies one of the telematics packets with a time or time interval that corresponds to the sending time of the text message. The network device identifies, based on the telematics packet and the text message indication, that the vehicle was being operated during the sending time of the text message and logs a texting-while-driving incident associated with the particular driver.

20 Claims, 9 Drawing Sheets

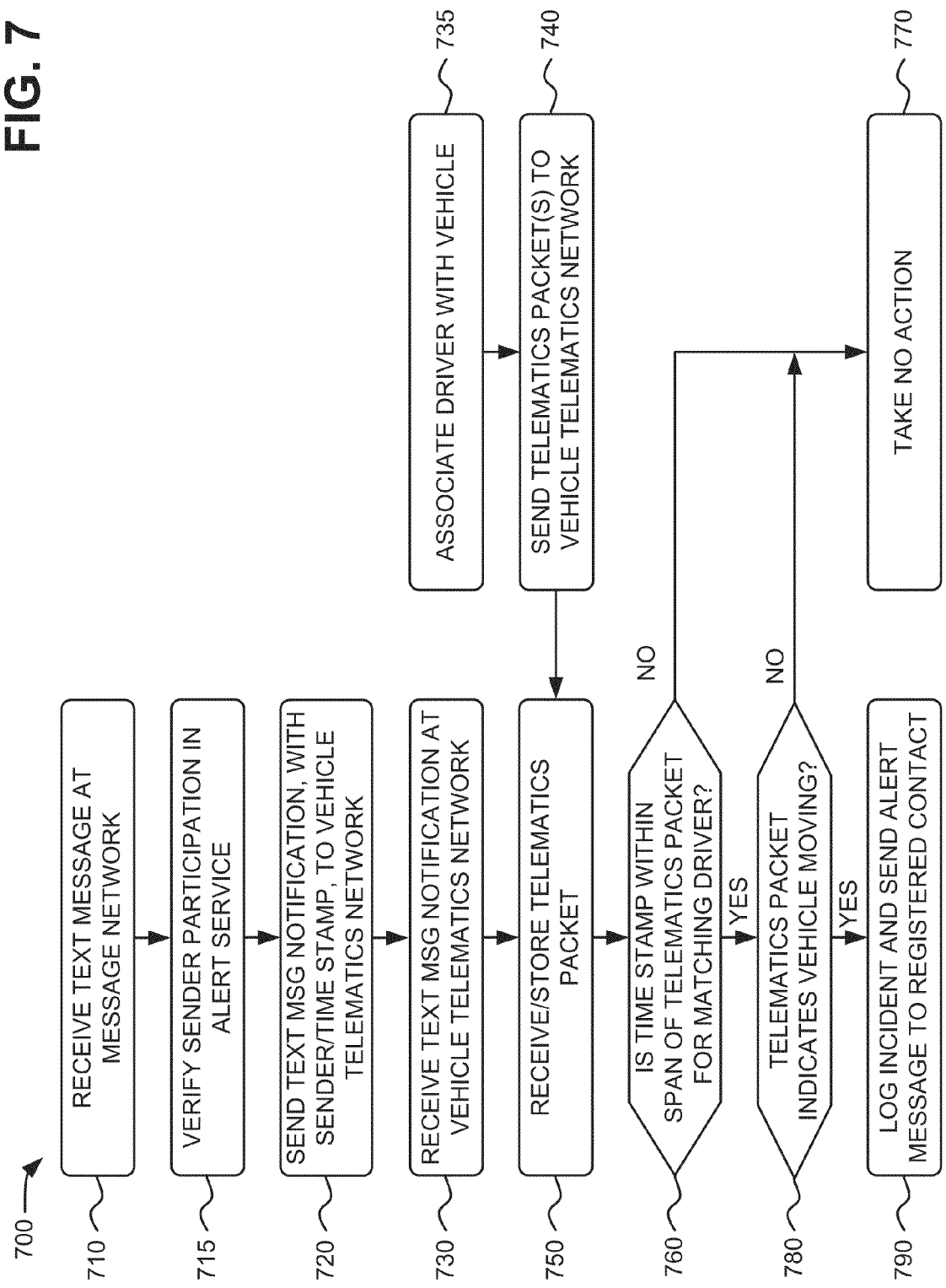

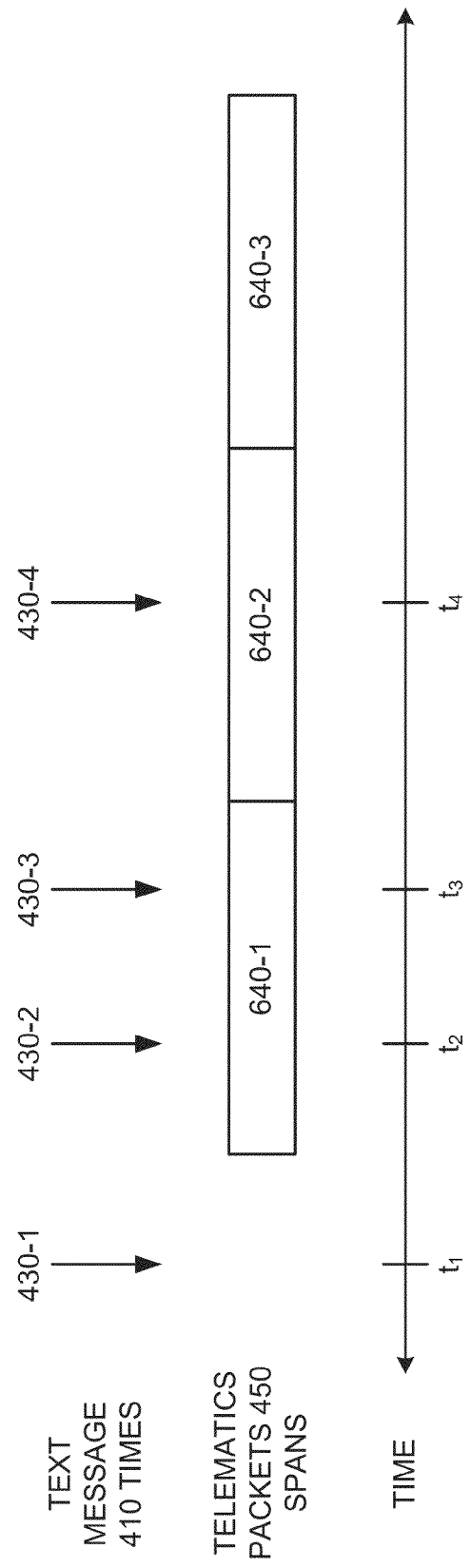

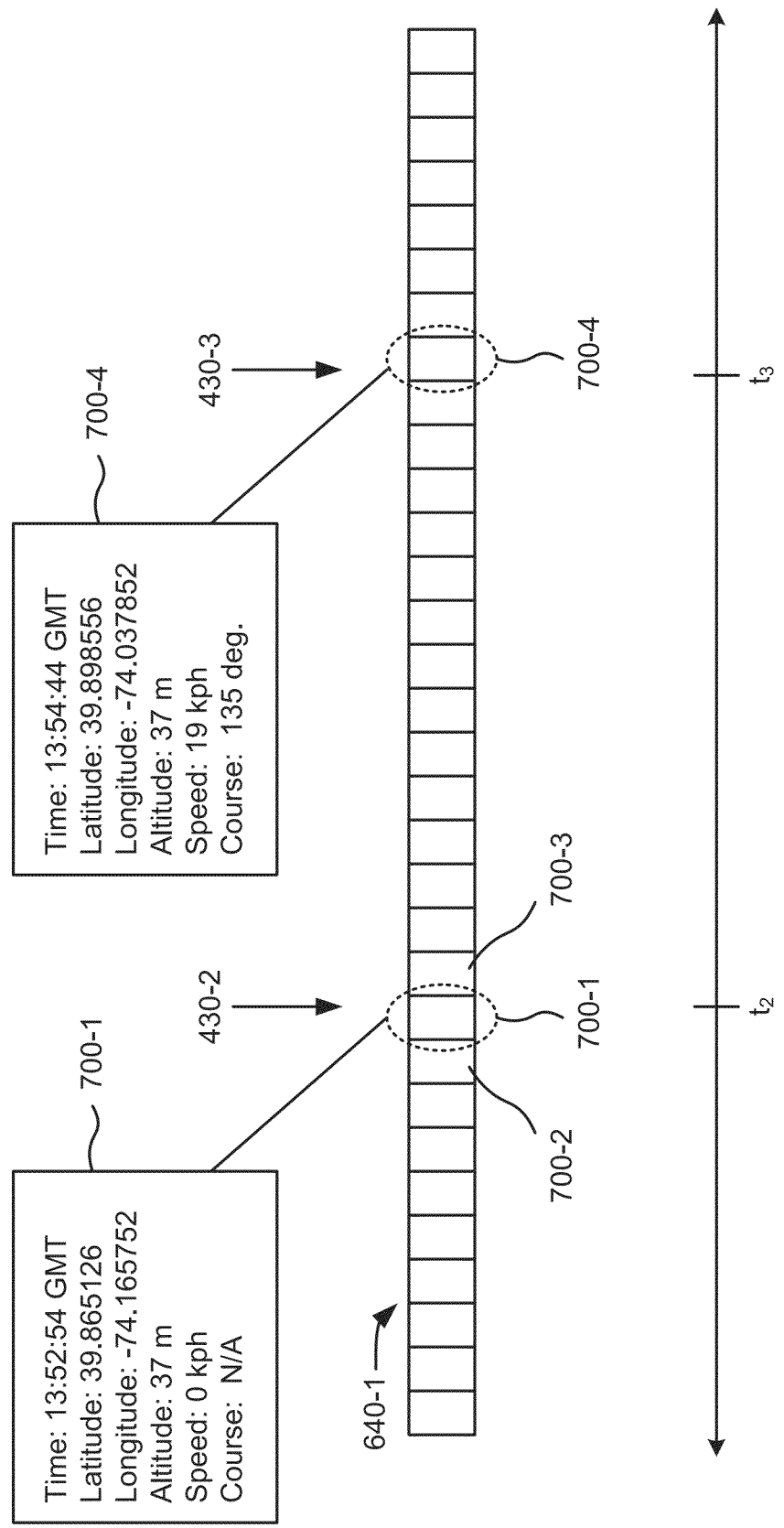

TEXTING DRIVER ALERT SERVICE

BACKGROUND

Texting while driving has become an increasing safety concern. Particularly, texting while driving is a leading cause of death for teen drivers.

Vehicle telematics units are becoming more prevalent as standard equipment in new vehicles, such as automobiles and light-duty trucks. Also, after-market vehicle telematics systems are available for installation on other vehicles.

BRIEF DESCRIPTION OF THE DRAWINGS

FIG. 7 is a flow chart of an exemplary process for implementing a texting driver alert service according to an implementation described herein; and FIGS. 8A and 8B are illustrations of exemplary tracking scenarios that may occur during the process described in FIG. 7.

DETAILED DESCRIPTION

The following detailed description refers to the accompanying drawings. The same reference numbers in different drawings may identify the same or similar elements.

Systems and methods described herein may provide a texting driver alert service to associate texting activity from a mobile device with driving activity as monitored by a vehicle telematics unit. One or more devices in a message network (e.g., providing text messaging services) may communicate with one or more devices in a telematics service network (e.g., providing vehicle telematics services) to identify concurrent instances of sending text messages and operating a vehicle. In one implementation, the systems and methods may identify when a text message is sent from a mobile device in a moving vehicle and send an alert signal to a registered contact (e.g., a parent, a fleet supervisor, etc.). In another implementation, the systems and methods may log texting activity and provide a report of texting in relation to driving activity for a particular individual.

As used herein, the term "mobile device" may generally refer to a consumer electronics device that provides text messaging capability over a broadband cellular service. As used herein, the term "sender" may refer to a person using a mobile device to send text messages. As used herein the term "text message" may refer generally to visual-based mobile communications, such as text messages, short message service (SMS) messages, "tweets," multimedia message service (MMS) messages, instant messages (IMs), mobile IMs (MIMs), and/or email messages. As used herein, the term "driver" may refer to a person who operates a vehicle associated with a vehicle telematics unit. As used herein, the term "customer" may refer to a person or entity that subscribes to a texting while driving alert service to track activity of a driver.

Figure 1:
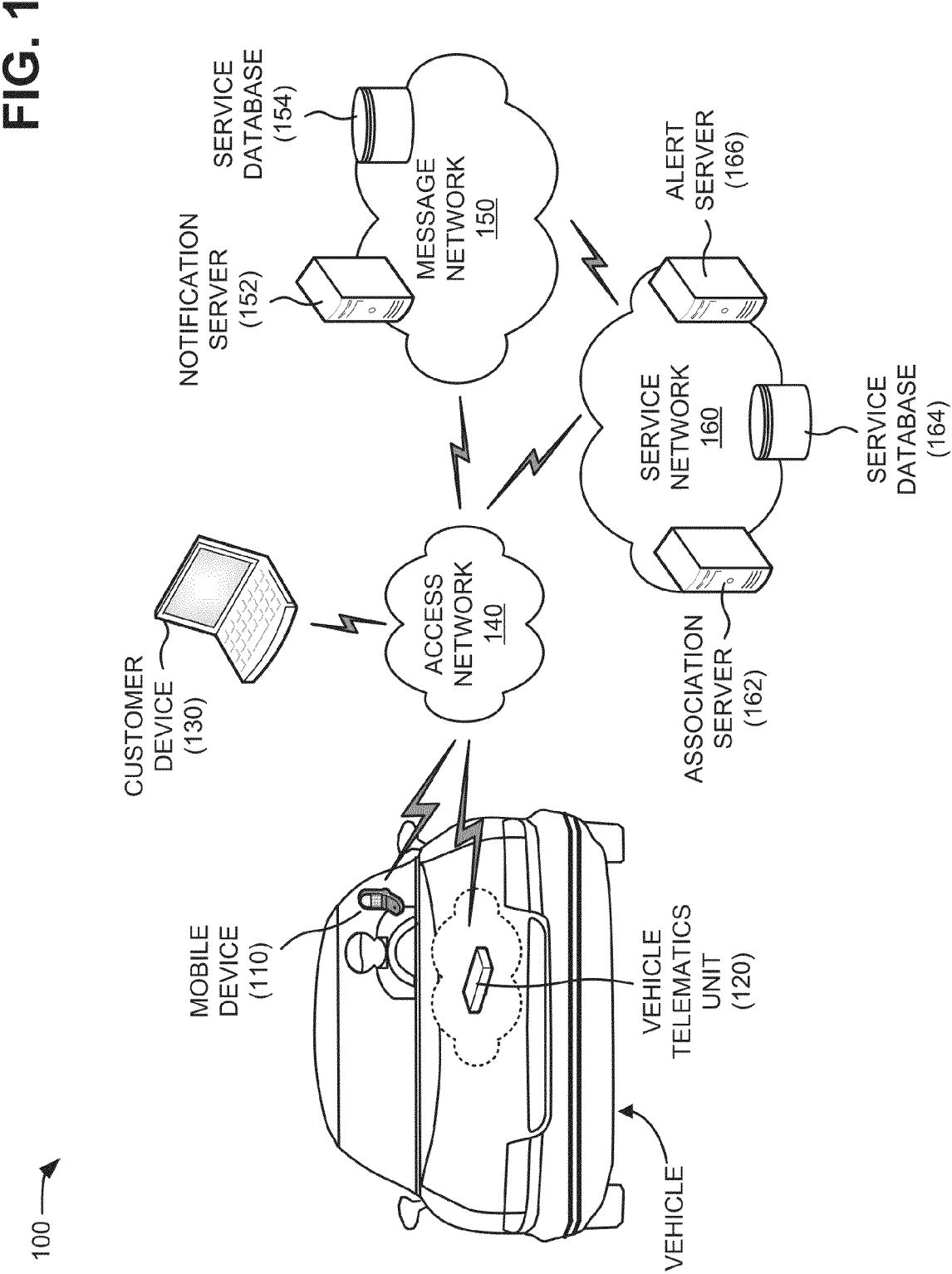
FIG. 1 depicts an exemplary network environment in which systems and/or methods described herein may be implemented.

FIG. 1 is an exemplary network environment 100 in which systems and/or methods described herein may be implemented. As illustrated, network environment 100 may include a mobile device 110, a vehicle telematics unit 120, a customer device 130, an access network 140, a message network 150, and a service network 160. Devices and/or networks of network environment 100 may interconnect via wired and/or wireless links.

Mobile device 110 may include a radiotelephone, a personal communications system (PCS) terminal (e.g., that may combine a cellular radiotelephone with data processing and data communications capabilities), a wireless device, a smart phone, a tablet, a personal digital assistant (PDA) (e.g., that can include a radiotelephone, a pager, Internet/intranet access, etc.), a laptop computer (e.g., with a wireless air card), a global positioning system (GPS) device, a gaming device, a portable media player, a consumer electronics device, or other types of computation or communication devices. In an exemplary implementation, mobile device 110 may be capable of communicating via access network 140. In other implementations, mobile device 110 may communicate via one or more short-range wireless communication standards for a wireless network, such as IEEE 802.11 (e.g., Wi-Fi) or IEEE 802.15 (e.g., Bluetooth) protocols.

Vehicle telematics unit 120 may include a data collection system, configured for installation in a vehicle, that receives data generated by vehicle sensors and/or a vehicle electronic control unit (ECU). Vehicle telematics unit 120 may include a device that is capable of communicating over access network 140 and/or service network 160. In implementations described herein, vehicle telematics unit 120 may receive information from vehicle sensors and/or the ECU and may transmit the information to service network 160 via access network 140 at periodic intervals (e.g., when the vehicle associated with vehicle telematics unit 120 is operating). Information from the vehicle telematics unit 120 may be sent as periodic messages referred to herein as telematics packets (although other message formats may be used). According to implementations described herein, the telematics packets may identify a particular driver and associate vehicle activity (e.g., collected by vehicle telematics unit 120) with the driver during operation of a vehicle.

Customer device 130 may include a computational or communication device. Customer device 130 may enable a user to send/receive messages, view content, and/or interact with other devices. For example, customer device 130 may include a personal computer (e.g., a laptop or desktop PC), a tablet computer, a smart phone, or other types of computational or communication devices that can communicate with devices in service network 160. In one implementation, customer device 130 may be associated with an account that is configured to receive messages from devices in service network 160. For example, customer device 130 may receive notifications of concurrent texting activity by mobile device 110 and driving activity from vehicle telematics unit 120 (e.g., when mobile device 110 and vehicle telematics unit 120 are associated).

Access network 140 may include a communications network that connects subscribed devices (e.g., mobile device 110, vehicle telematics unit 120, etc.) with devices in message network 150 and service network 160. Access network 140 may generally include a local area network (LAN), a wide area network (WAN), a metropolitan area network (MAN), a wireless network, a satellite network, an optical fiber (or fiber optic) network, or a combination of networks. In one implementation, access network 140 may include an Internet Protocol (IP)-based network. In some implementations, access network 140 may be a private network controlled by, for example, a telecommunications company that provides telephone and/or data access to vehicle telematics unit 120. In another implementation, access network 140 may be a public network, such as the Internet, or a combination of public and private networks. Generally, access network 140 may include at least one radio access network capable of supporting wireless communications to/from vehicle telematics unit 120. The radio access network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), enhanced high-rate packet data (eHRPD), or a network implemented in accordance with future wireless access network standards.

Message network 150 may include network devices that facilitate the transmission of text messages or other text traffic from a sending device to a recipient device. Message network 150 may include, for example, a mobile switching center (MSC), a home location register (HLR), a signal transfer point (STP), and Signaling System 7 (SS7) links. In another implementation, message network 150 may include a short message service center (SMSC) to implement text messaging in a mobile telephone network. According to implementations herein, message network 150 may include a notification server 152 and a service database 154 to support a texting driver alert service.

Notification server 152 may include one or more server devices, or other types of computation or communication devices that gather, process, search, and/or provide information in a manner described herein. Notification server 152 may identify when a particular mobile device 110 that is registered with a texting driver alert service sends a text message. For example, notification server 152 may monitor message activity through the SMSC or other devices in message network 150 to detect text messages sent from mobile devices 110 that are registered with the texting driver alert service. When a text message from mobile device 110 registered with the texting driver alert service is identified, notification server 152 may provide a notification, including a device/user identifier and a time stamp, to service network 160. To determine if a particular text message is to undergo review for the texting driver alert service, notification server 152 may retrieve information from service database 154.

Service database 154 may include a database or another data structure to store data pertaining to the texting driver alert service. Service database 154 may store, for example, an indication that a particular sender (e.g., user of mobile device 110) is a registered participant in the texting driver alert service, sender registration information (e.g., user ID, device ID, device media access control (MAC) address, etc.), and/or vehicle information (e.g., vehicle identification number (VIN)) associated with the particular sender. In an exemplary implementation, service database 154 may include a lookup table to match one or more mobile devices 110 or sender identifiers with a single vehicle telematics unit 120 or multiple vehicle telematics units 120 (e.g., for multiple vehicles owned/used by a single subscriber). Additionally, or alternatively, service database 154 may be used to match one or more mobile devices 110 or sender identifiers with one or more VINs. In one implementation, notification server 152 may use service database 154 to identify if an incoming text message is to be analyzed as part of the texting driver alert service.

Service network 160 may include network devices (e.g., association server 162, service database 164, alert server 166, and other devices) that provide a backend support system for vehicle telematics services, including a texting driver alert service. Service network 160 may include, for example, one or more private IP networks that use a private IP address space. Service network 160 may include a local area network (LAN), an intranet, a private wide area network (WAN), etc. In one implementation, service network 160 may implement one or more virtual private networks (VPNs) for providing communication between devices within service network 160. Service network 160 may be protected/separated from other networks, such as access network 140, by a firewall. Although shown as a single element in FIG. 1, service network 160 may include a number of separate networks.

Association server 162 may include one or more network devices, or other types of computation or communication devices that gather, process, search, and/or provide information in a manner described herein. In one exemplary implementation, association server 162 may receive data from vehicle telematics unit 120 and store the information in service database 164. For example, association server 162 may receive telematics packets from vehicle telematics unit 120 (e.g., at period intervals when a corresponding vehicle is being operated). In another implementation, association server 162 may retrieve information from service database 164 (e.g., in response to receiving a text message notification from notification server 152) and determine if the text message was sent from a moving or operating vehicle. Association server 162 may be a distributed component.

Service database 164 may include a database or another data structure to store data provided by vehicle telematics unit 120. Service database 164 may store, for example, driver registration information (e.g., driver ID, MAC address, etc.), vehicle registration information, and vehicle operating data. In an exemplary implementation, service database 164 may store telematics packets provided from vehicle telematics unit 120. In another implementation, service database 164 may also store historical records for text messaging activity for particular drivers and/or vehicles over a particular time period (e.g., a week, a month, a year, etc.). Historical records may be used, for example, to generate cumulative reports of driver activity (e.g., including texting activity).

Alert server 166 may include one or more network devices, or other types of computation or communication devices that generate notifications (e.g., email, text messages, etc.) for subscribers. For example, alert server 166 may receive, from association server 162, an indication that a particular driver is texting while driving (e.g., based on comparison of text message data from mobile device 110 and vehicle telematics unit 120 data) and automatically send notifications to particular subscriber accounts. For example, alert server 166 may store (e.g., locally or in service database 164) subscriber contact information associated with each registered driver/device in the texting driver alert service. The subscriber contact information may be for a parent, supervisor, manager, etc., associated with the driver. The contact information may be associated with a particular device (e.g., customer device 130) or a particular subscriber account (e.g., an email or messaging account).

In FIG. 1, the particular arrangement and number of components of network environment 100 are illustrated for simplicity. In practice there may be more mobile devices 110, vehicle telematics units 120, customer devices 130, access networks 140, message networks 150, service networks 160, and/or devices within the networks. For example, there may be thousands of mobile devices 110 and/or vehicle telematics units 120. Also, some devices, such as devices in message network 150 and service network 160, may be combined in a single component or a distributed component.

Figure 2:
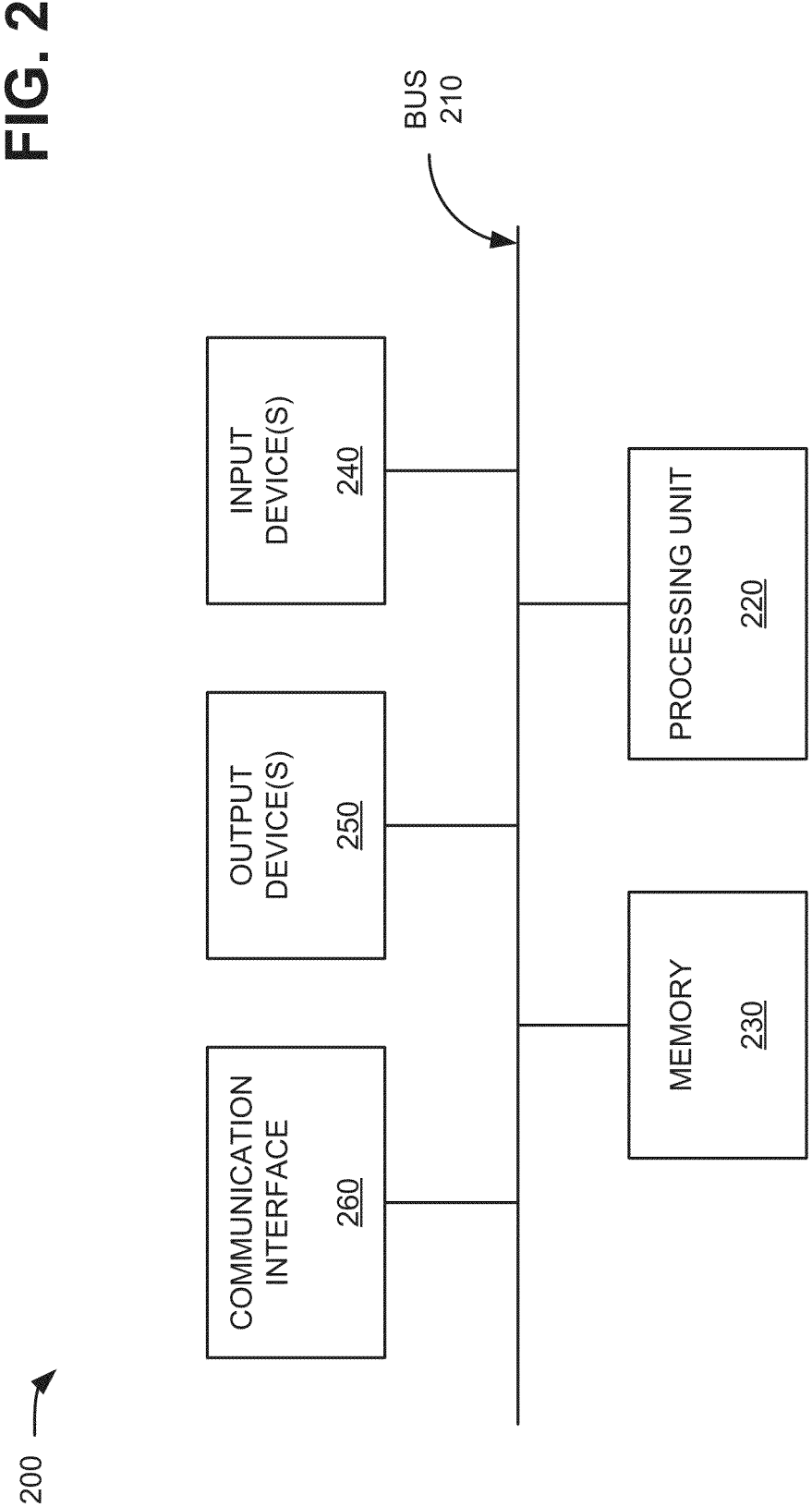
FIG. 2 is a diagram of exemplary components of a device that may correspond to a mobile device, a customer device, or an application server of the network depicted in FIG. 1.

FIG. 2 is a diagram illustrating exemplary components of a device 200. Each of mobile device 110, customer device 130, notification server 152, association server 162 and alert server 166 may be implemented/installed as a combination of hardware and software on one or more of devices 200. As shown in FIG. 2, device 200 may include a bus 210, a processing unit 220, a memory 230, one or more input devices 240, one or more output devices 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits a user to input information to device 200, such as a keyboard, a keypad, a mouse, a pen, a microphone, one or more biometric mechanisms, and the like. Output device 250 may include a device that outputs information to the user, such as a display, a speaker, etc.

Communication interface 260 may include a transceiver that enables device 200 to communicate with other devices and/or systems. For example, communication interface 260 may include mechanisms for communicating with other devices, such as other devices of network environment 100. In one implementation, communications interface 260 may support short range wireless network communications (e.g., via Bluetooth protocols). In another implementation, communications interface 260 may support long range wireless network communications (e.g., cellular network services). In other implementations, communication interface 260 may support other wired or wireless network communications.

As described herein, device 200 may perform certain operations in response to processing unit 220 executing software instructions stored in a computer-readable medium, such as memory 230. A computer-readable medium may include a non-transitory tangible memory device. A memory device may be implemented within a single physical memory device or spread across multiple physical memory devices. The software instructions may be read into memory 230 from another computer-readable medium or read into memory 230 from another device via communication interface 260. The software instructions stored in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than those depicted in FIG. 2. As an example, in some implementations, a display may not be included in device 200. In these situations, device 200 may be a "headless" device that does not include input device 240 and/or output device 250. Alternatively, or additionally, one or more components of device 200 may perform one or more other tasks described as being performed by one or more other components of device 200.

Figure 3:
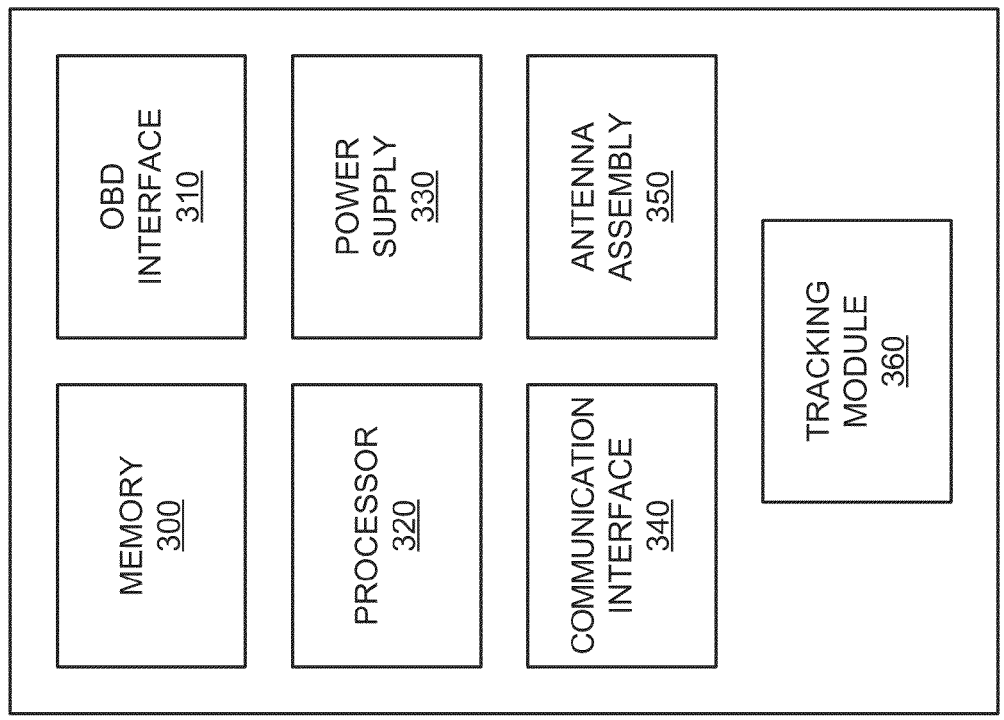
FIG. 3 is a diagram of exemplary components of a vehicle telematics unit of the network depicted in FIG. 1.

FIG. 3 is a block diagram of exemplary components of vehicle telematics unit 120. As shown in FIG. 3, vehicle telematics units 120 may include a memory 300, an on-board diagnostics (OBD) interface 310, a processor 320, a power supply 330, a communication interface 340, an antenna assembly 350, and a tracking module 360.

Memory 300 may include a RAM, a ROM, and/or another type of memory to store data and instructions that may be used by processor 320.

OBD interface 310 may include a physical connector interface for use with a vehicle's on-board diagnostic systems. For example, OBD interface 310 may be configured to receive diagnostic and/or control information from a vehicle's OBD-II system or another on-board diagnostic system protocol. In one implementation, OBD interface 310 may also receive power from the vehicle (e.g., a vehicle battery) to run vehicle telematics unit 120. Vehicle telematics unit 120 may also be directly coupled to the vehicle's communication bus, such as when a vehicle manufacturer installs the telematics unit when assembling the vehicle. In such installations, vehicle telematics unit 120 does not need to couple via an OBD-II connector.

Processor 320 may include one or more processors, microprocessors, application specific integrated circuits (ASICs), field programmable gate arrays (FPGAs), or other processing logic. Processor 320 may control operation of vehicle telematics unit 120 and its other components.

Power supply 330 may include one or more batteries or other power source components used to supply power to components of vehicle telematics unit 120. Power supply 330 may also include control logic to control application of power from an external power source (e.g., a vehicle battery) to one or more components of vehicle telematics unit 120.

Communication interface 340 may include a logical component that includes input and/or output ports, input and/or output systems, and/or other input and output components that facilitate the transmission of data to/from other devices. For example, communication interface 340 may include a network interface card (e.g., Ethernet card) for wired communications and/or a wireless network interface card for wireless communications. In one implementation, communication interface 240 may include a Bluetooth interface or another wireless interface that allows vehicle telematics unit 120 to "pair up" and communicate wirelessly with other devices, such as mobile devices 110 that includes a Bluetooth interface. In other implementations, communication interface may also include a universal serial bus (USB) port for communications over a cable, a radio-frequency identification (RFID) interface, a near-field communications (NFC) wireless interface, and/or any other type of interface that converts data from one form to another form.

Antenna assembly 350 may include one or more antennas to transmit and/or receive RF signals over the air. Antenna assembly 350 may, for example, receive RF signals from communication interface 340 and transmit the signals over the air and receive RF signals over the air and provide them to communication interface 340.

Tracking module 360 may include a logical component to report routine driver activity. Although described as a separate component, in other implementations, tracking module 360 may be included as part of processor 320. Tracking module 360 may collect vehicle information (e.g., while the vehicle is operating) for the vehicle into which vehicle telematics unit 120 is installed. In one implementation, tracking module 360 may collect data samples at regular intervals (e.g., every 1 second, 5 seconds, 10 seconds, etc.). The data samples may generally include a sampling time and information from which movement and/or a speed of vehicle travel can be derived. The data samples may include, for example, a time stamp, data values corresponding to engine parameters or other vehicle operational parameters, a geographical position (e.g., latitude/longitude/altitude), and/or a vector (e.g., speed, course, heading, etc.). The vector may be based on, for example, changes in geographical position between successive data samples. Tracking module 360 may generate telematics packets, that include multiple data samples, on a periodic basis (e.g., every 5 minutes, 10 minutes, or 15 minutes). Tracking module 360 may send the telematics packets to service network 160 (e.g., to association server 162) using communication interface 340.

Although FIG. 3 shows exemplary components of vehicle telematics unit 120, in other implementations, vehicle telematics unit 120 may include fewer components, different components, differently-arranged components, or additional components than those depicted in FIG. 3. Alternatively, or additionally, one or more components of vehicle telematics unit 120 may perform one or more other tasks described as being performed by one or more other components of vehicle telematics unit 120.

Figure 4:
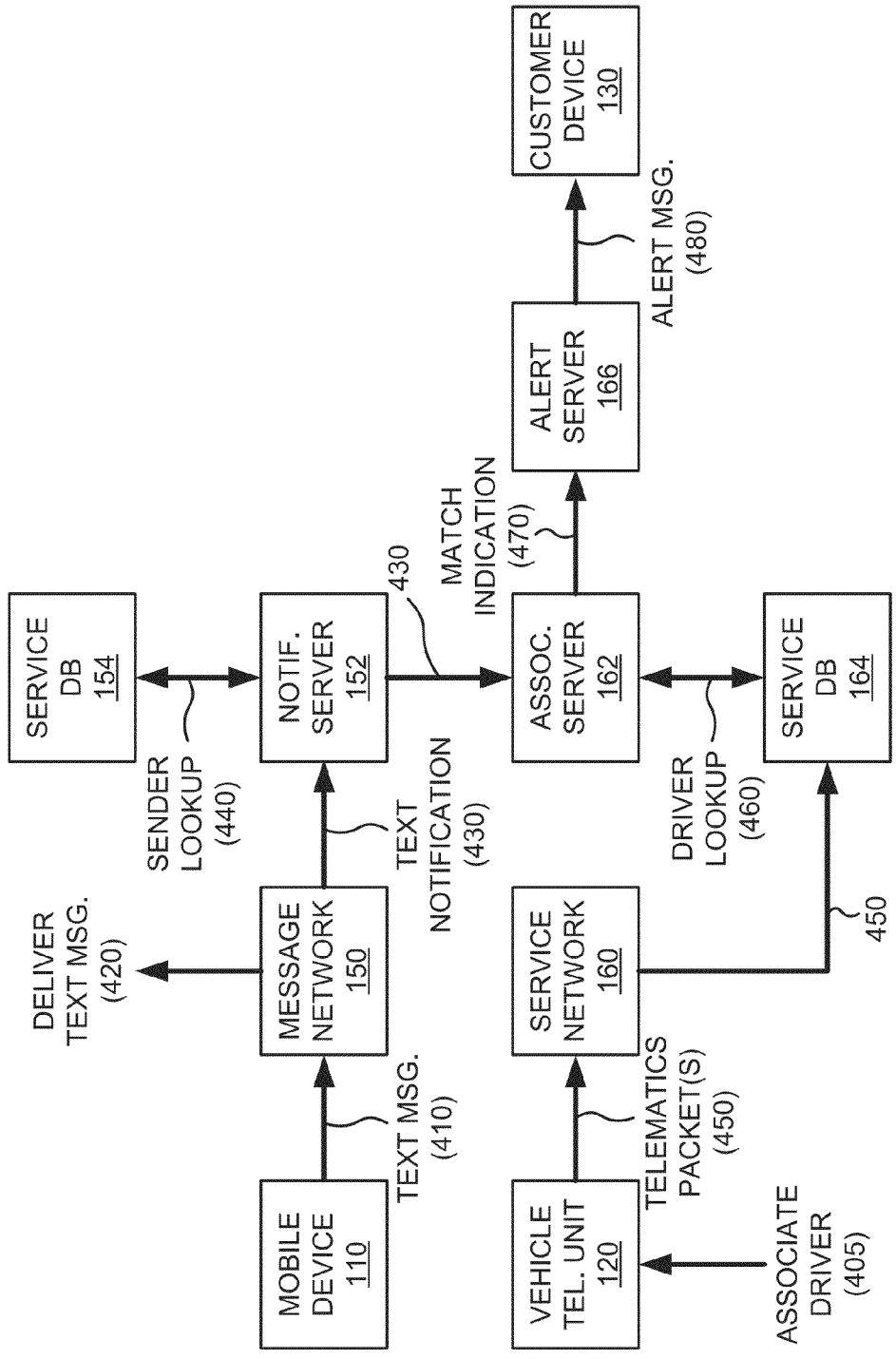
FIG. 4 is a diagram of exemplary communications among devices in a portion of the network of FIG. 1.

FIG. 4 is a diagram of exemplary communications among components of a portion 400 of network environment 100 according to an implementation described herein. Communications in FIG. 4 may illustrate processes for using the texting driver alert service to alert a subscriber when a registered driver is texting while driving. As shown in FIG. 4, network portion 400 may include mobile device 110, vehicle telematics unit 120, customer device 130, notification server 152, service database 154, association server 162, and alert server 164.

Referring to FIG. 4, a driver of a vehicle (e.g., a fleet driver, a teenage driver, etc.) may be associated with vehicle telematics unit 120, as indicated by reference number 405. Various techniques for associating the driver with vehicle telematics unit 120 may be used. For example, RFID cards, key fobs, pass codes, voice recognition, and/or passive detection of a driver device (e.g., mobile device 110) may be used to associate a particular driver with vehicle telematics unit 120. In one implementation, after driver association, vehicle telematics unit 120 may log ongoing vehicle activity with the associated driver (e.g., using a particular driver ID).

A mobile device user (who may also be the driver of the vehicle) may use mobile device 110 to send a text message 410. Text message 410 may be serviced through access network 140 (not shown) and message network 150 to provide delivery to an intended recipient, as indicated by reference number 420. Additionally, message network 150 may provide a text notification 430 to notification server 152. Text notification 430 may include, for example, information about the text message, such as a sending time, a sender ID, a device ID, etc. In one implementation, text notification 430 may include a message header corresponding to text message 410 without the text body. In another implementation, text notification 430 may be a separate message generated based on particular fields (e.g., sender, time, etc.) in text message 410. In still other implementations, text notification 430 may simply include a copy of text message 410.

Notification server 152 may receive text notification 430 and may perform a lookup to determine if text message 410 is subject to review under the texting driver alert service. For example, notification server 152 may conduct a sender lookup 440 on service database 154 using information in text notification 430. Sender lookup 440 may include, for example, using a sender ID or a device ID associated with text notification 430 to identify if a matching sender ID or device ID is registered for the texting driver alert service. If service database 154 has a matching record for the matching sender ID or device ID in text notification 430, sender lookup 440 may indicate a positive match.

Assuming notification server 152 receives a positive response to sender lookup 440, notification server 152 may forward text notification 430 (or a new message with information similar to text notification 430) to association server 162. For example, text notification 430 may include at least a sending time, a sender ID, and/or a device ID.

Figure 5:
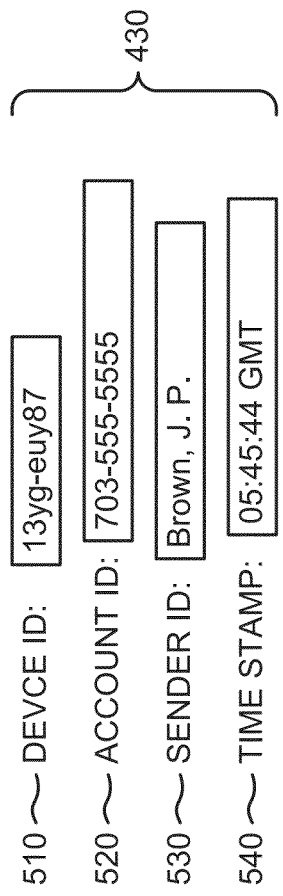
FIG. 5 is a diagram illustrating a portion of an exemplary text notification message that may be provided by the notification server, according to an implementation described herein.

FIG. 5 provides an example of text notification 430 that may be generated by or forwarded by notification server 152. As shown in FIG. 5, text notification 430 may include a device identifier (ID) field 510, an account ID field 520, a sender ID field 530, and a time stamp field 540. The portion of text notification 430 shown in FIG. 5 may correspond to a single notification for a particular text message 410.

Device identifier field 510 may include a unique device identifier, such as a MAC address or another identifier associated with mobile device 110. Account identifier field 520 may include a unique account associated with a sender of text message 410. For example, account identifier field 520 may include a phone number or another account with which text messages from the sender may be associated. Sender ID field 530 may include a name or association of the sender of text message 410. Time stamp field 540 may include a sending time of text message 410. The sending time may be based on, for example, a message header in text message 410 or other data from access network 140 and/or message network 150.

Generally, text notification 430 may include sufficient information to enable message network 150 and/or service network 160 to (1) identify if a sender of text message 410 is a participant in the texting driver alert service and/or (2) cross-reference a sender of text message 410 with a driver of a vehicle including vehicle telematics unit 120. Although FIG. 5 shows exemplary fields of text notification 430, in other implementations, text notification 430 may include different fields or additional fields than those depicted in FIG. 5. For example, in other implementations, text notification 430 may include a unique text notification 430 identifier or other information.

Returning to FIG. 4, vehicle telematics unit 120 may provide telematics packets 450 to service network 160 on a periodic basis. Telematics packets 450 may include multiple data samples of data collected from vehicle systems. Vehicle telematics unit 120 may send telematics packets 450 to service network 160 at regular intervals while a corresponding vehicle is operating.

Figure 6:
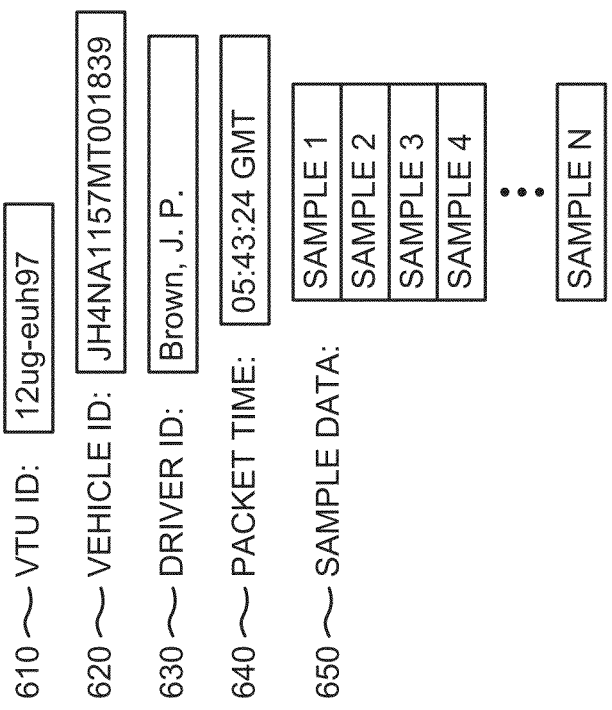
FIG. 6 is a diagram illustrating a portion of an exemplary telematics packet that may be provided by the vehicle telematics unit, according to an implementation described herein.

FIG. 6 provides an example of telematics packet 450 that may be generated by vehicle telematics unit 120. As shown in FIG. 6, telematics packet 450 may include a vehicle telematics unit (VTU) identifier (ID) field 610, a vehicle ID field 620, a driver ID field 630, a packet time field 640, and a sample data field 650. The portion of telematics packet 450 shown in FIG. 6 may correspond to a single packet for a particular driver/vehicle combination.

VTU ID field 610 may include a unique identifier (e.g., "12ug-euh97") for a vehicle telematics unit (e.g., vehicle telematics unit 120) providing data to service network 160. Vehicle ID field 620 may include a VIN or another vehicle identifier of the vehicle to which vehicle telematics unit 120 is connected/installed.

Driver ID field 630 may include a name, an employee identification number, or other information to uniquely identify a driver of a vehicle associated with vehicle telematics unit 120. For example, a driver name (e.g., "Brown, J. P.") may be inserted in driver ID field 630 based on information obtained from association 405 described above. In other implementations, driver ID field 630 may include a MAC address, device ID, phone number, or other information to uniquely identify a driver and/or a device associated with the driver.

Packet time field 640 may include a time associated with telematics packet 450. In one example, packet time field 640 may include a time of a first sample (e.g., the earliest in time data stored in telematics packet 450). In another example, packet time field 640 may include a time of a last sample (e.g., the latest in time data stored in telematics packet 450). In still another example, packet time field 640 may include a range of time (e.g., a start and end time for data).

Sample data field 650 may include individual data samples (e.g., "sample 1," "sample 2," "sample 3," etc.) for small time periods (e.g., several seconds) based on vehicle data collected by vehicle telematics unit 120. The number of samples included in each telematics packet 450 may depend on the sample collection interval (e.g., 5 seconds, 10 seconds, etc.) and the packet interval (e.g., 5, minutes, 10 minutes, 15 minutes, etc.). As an example, vehicle telematics unit 120 (e.g., tracking module 360) may send a telematics packet every 5 minutes that includes 30 consecutive 10-second samples in sample data field 650. Each sample in sample data field 650 may include a time, a geographical position (e.g., latitude/longitude/altitude), and a vector (e.g., speed, course, etc.). The vector may be based on, for example, changes in geographical position between successive data samples. Information in one or more samples from sample data 650 may be used (e.g., by association server 162) to determine, for example, if a vehicle associated with vehicle telematics unit 120 is moving. Additionally, or alternatively, each sample in sample data field 650 may include engine parameter data, such as mass air flow, throttle position, transmission data, etc., or any other telematics data to determine whether the vehicle is moving.

Although FIG. 6 shows exemplary fields of telematics packet 450, in other implementations, telematics packet 450 may include different fields or additional fields than those depicted in FIG. 6. For example, in other implementations, telematics packet 450 may include a unique telematics packet 450 identifier or other information.

Returning to FIG. 4, service network 160 may store and/or process telematics packet 450 for any one of a variety of services that may be provided via service network 160. Additionally, or alternatively, service network 160 may provide telematics packet 450 to service database 164.

Association server 162 may receive text notification 430 from notification server and, in response, may perform a driver lookup 460 to determine if sender and time information (e.g., sender ID field 530 and time stamp field 540) in text notification 430 match a time interval of one of telematics packets 450. In one implementation, association server 162 may hold text notification 430 for a particular period (e.g., several minutes, or a period equating to the longest interval between successive telematics packets 450) to verify text notification 430 has not preceded a relevant telematics packet 450 to association server 162.

Driver lookup 460 may include, for example, a sender ID or a device ID associated with text notification 430. Driver lookup 460 may include, for example, using a sender ID, device ID, and/or time stamp associated with text notification 430 to identify if a matching driver ID and packet time is present in a telematics packet in service database 164. If service database 164 has a matching telematics packet 450 for the sender ID, device ID, and/or time stamp associated with text notification 430, driver lookup 460 may indicate a positive match.

Assuming association server 162 receives a positive response to driver lookup 460, association server 162 may perform a more detailed analysis of individual samples (e.g., in sample data field 650 of telematics packet 450) to determine if the vehicle associated with vehicle telematics unit 120 was moving during the time the text message corresponding to text notification 430 was sent. For example, vehicle telematics unit 120 may match a particular data sample from sample data field 650 to the time stamp from text notification 430. In one embodiment, when packet time 640 of telematics packet 450 corresponds to the time telematics packet 450 was sent, association server 162 may use known sample intervals of the individual samples from sample data field 650 to determine the particular sample(s) to evaluate. For example, if the time stamp 540 of text notification 430 is 130 seconds less than packet time 640 of telematics packet 450, and the sample rate for samples in sample data field 650 is one sample every ten seconds, then association server 162 would count back thirteen samples from the last telematics sample in telematics packet 450 and evaluate the corresponding data sample to determine whether the vehicle associated with telematics unit 120 was moving at the time the vehicle generated the data stored in the sample.

Association server 162 may then use the information from the data sample (and, optionally, other near-in-time data samples) to determine if the vehicle corresponding to vehicle telematics unit 120 was moving at the time indicated by text notification 430. For example, association server 162 may use any information available from the appropriate data sample (s) in telematics packets 450 to determine operating conditions of the vehicle at the time associated with the time stamp 540 of text notification 430.

Assuming association server 162 identifies that the vehicle corresponding to vehicle telematics unit 120 was moving at the time indicated by text notification 430, association server 162 may log a texting-while-driving incident for the driver/sender. Additionally, or alternatively, association server 162 may send a match indication 470 to alert server 166. Upon receiving match indication 470, alert server 166 may generate an alert message 480. Alert message 480 may include a text message, email, voice recording, or another type of automated message directed to a registered contact of the texting driver alert service. For example, match indication 470 may provide the driver ID, text time-stamp, vehicle location, or other information from the texting-while-driving incident for the driver/sender. Alert server 166 may perform a lookup (e.g., with service database 164, a local memory, or another device) to determine a contact account (e.g., for a manager, parent, etc.) associated with the driver/sender and provide alert message 480 via the contact account to customer device 130. In another implementation, association server 162 and/or alert server 166 may log multiple texting-while-driving incidents before sending alert message 480. For example, in one implementation, a particular number of texting-while-driving incidents (e.g., 2, 5, 10, etc.) may be needed to trigger alert message 480. In another implementation, alert message 480 may be provided at periodic intervals (e.g., hourly, daily, weekly, monthly, etc.).

Although FIG. 4 shows exemplary communications among components of network portion 400, in other implementations, fewer, additional, and/or different communications than depicted in FIG. 4 may be performed within network portion 400. In still other implementations, one or more components of network portion 400 may perform one or more other tasks described as being performed by one or more other components of network portion 400.

FIG. 7 is a flow chart of an exemplary process for implementing a texting driver alert service according to an implementation described herein. In one implementation, process 700 may be performed by one or more devices in message network 150 and service network 160. In other implementations, process 700 may be performed by one or more other devices of network environment 100, such as vehicle telematics unit 120 in conjunction with devices in message network 150 and/or service network 160. Process 700 is described with reference to components in figures described above and the sample scenarios of FIGS. 8A and 8B.

As shown in FIG. 7, process 700 may include a receiving a text message at a message network (block 710), and verifying sender participation in the texting while driving alert service (block 715). For example, a mobile device user may use mobile device 110 to send a text message 410 (e.g., FIG. 4). Text message 410 may cause message network 150 to generate a text notification 430 that may be provided to notification server 152. Text notification 430 may include, for example, information about the text message, such as a sending time, a sender ID, a device ID, etc. As shown in FIG. 8A, multiple text messages 410 may generate multiple text notifications 430 (e.g., each corresponding to a different text message 410) at different times. For example, a first text notification 430-1 may be received at time $t_1$, a second text notification 430-2 may be received at a time $t_2$, a third text notification 430-3 may be received at a time $t_3$, and a fourth text notification 430-4 may be received at a time $t_1$. Notification server 152 may perform a sender lookup 440 (e.g., FIG. 4) for each text notification 430 to determine if the sender of text message 410 is subject to review under the texting while driving alert service.

Process 700 may additionally include sending a text message notification, including a sender and time stamp, to a vehicle telematics network (block 720), and receiving the text message notification at the vehicle telematics network (block 730). For example, assuming text messages 410 are subject to review under the texting while driving alert service, notification server 152 may provide text notification 430 to association server 162. In the example of FIG. 8A, text notifications 430-1 through 430-4 may each correspond to a separate text message sent from the same sender. Thus, association server 162 in service network 160 may receive four separate notifications 430-1 through 430-4 from notification server 152 in message network 150.

Process 700 may also include associating a driver with a vehicle (block 735), and sending telematics packet(s) to the vehicle telematics network (block 740). For example, vehicle telematics unit 120 may be associated with a particular fleet vehicle or personal vehicle shortly before or after the vehicle is started. The driver/vehicle association may be made, for example, by entering a code prior to operating/starting the vehicle, or via other active or passive techniques, such as RFID cards, key fobs, voice recognition, Bluetooth discovery, etc. Vehicle telematics unit 120 may send telematics packets 450, associated with the driver, to service network 160. Telematics packets 450 may include packet time 640 and multiple samples (e.g., in sample data field 650). In the example of FIG. 8A, vehicle telematics unit 120 may send three successive telematics packets 450 with packet times of 640-1, 640-2 and 640-3, respectively.

Also in process 700, the telematics packet may be received and stored (block 750). For example, service network 160 may receive telematics packets 450 from vehicle telematics unit 120 and store them in service database 164. In one implementation, telematics packets 450 may be stored for future lookups by association server 162.

It may be determined if a time stamp of the message notification is within a time span covered by a telematics packet for a matching driver (block 760). For example, association server 162 may identify telematics packets 450 with a driver ID 630 (or other identifier) that matches the sender ID 530 (or other identifier) of notification 430. Association server 162 may compare a time stamp 540 of text notification 430 with a packet time 640 of telematics packets 450 to determine if there is an overlap between the text notification time and a tracking interval for a vehicle telematics unit associated with the message sender. In the example of FIG. 8A, text notification 430-1 at time $t_1$ may not fall within a telematics packet interval. Text notifications 430-2 and 430-3 may fall within the telematics packet interval of packet time 640-1; and text notification 430-4 may fall within the telematics packet interval of packet time 640-2.

If the time stamp of the message notification is not within a time span covered by the telematics packet (block 760—NO), then no action is taken (block 770). For example, if association server 162 determines that the time of text notification 430 does not fall within the monitored period of vehicle telematics unit 120 that is associated with the sender, then association server 162 may deem that the text message 410 corresponding to text notification 430 was not sent while driving. In the example of FIG. 8A, text notification 430-1 at time $t_1$ would be determined as not sent while driving, and no action (e.g., alerting action) would be taken by service network 160.

If the time stamp of the message notification is within a time span covered by the telematics packet (block 760—YES), then it may be determined if the telematics packet indicates that a vehicle associated with the text message sender is moving (block 780). For example, if association server 162 determines that the time of text notification falls within the monitored period of vehicle telematics unit 120 that is associated with the sender, association server 162 may perform a more detailed inspection of the particular telematics packet 450 to determine if the vehicle associated with vehicle telematics unit 120 was moving at the time of text notification 430. In the example of FIG. 8A, text notifications 430-2, 430-3, and 430-4 would be identified for further inspection based on overlap with packet times 640-1 or 640-2. Particularly, association server 162 may identify particular samples within each corresponding telematics packet 450 to determine if the vehicle was moving at the time text notifications 430-2, 430-3, or 430-4.

If the telematics packet indicates that the vehicle was not moving (block 780—NO), then no action is taken (block 770). For example, if a sample in telematics packet 450 that corresponds to the time of text notification 430 indicates a vehicle is not moving, then no action (e.g., alerting action) would be taken by service network 160. In the example of FIGS. 8A and 8B, text notification 430-2 at time $t_2$ may fall within the time period of a particular sample 700-1. Association server 162 may inspect vehicle tracking data in sample 700-1 to determine that a vehicle speed for the particular sample 700-1 was 0 kilometers per hour (e.g., the vehicle was not moving at the time of the sample). In one implementation, association sever 162 may also review samples near in time to sample 700-1, such as samples 700-2 and 700-3, to determine if vehicle movements, engine parameters, or locations may indicate texting during driving conditions in a stopped vehicle (e.g., stop light, stop-and-go traffic, etc.). Assuming analysis of samples 700-1 through 700-3 shows no vehicle movement (or indication of driving conditions), association server 162 may take no further action.

If the telematics packet indicates that the vehicle is moving (block 780—YES), then a texting-while-driving incident may be logged and an alert message may be sent to a registered contact account (block 790). For example, if a sample in telematics packet 450 that corresponds to the time of text notification 430 indicates a vehicle is moving, then service network 160 (e.g., association server 162 and/or alert server 166) may log an instance of texting while driving and generate an alert signal. In the example of FIGS. 8A and 8B, text notification 430-3 at time $t_3$ may fall within the time period of a particular sample 700-4. Association server 162 may inspect vehicle tracking data in sample 700-4 to determine that a vehicle speed of the particular sample 700-4 was 19 kilometers per hour. Based on detection of a moving vehicle (e.g., a speed above 0 kph), association server 162 may log the incident and/or signal alert server 166 to provide alert message 480 (FIG. 4) to a customer of the texting while driving alert service.

In implementations described herein, a network device may receive an indication of a text message sent from a sender via a mobile device and may receive multiple telematics packets from a vehicle telematics unit. Each of the multiple telematics packets may include operating data from a vehicle, associated with a driver and a time interval. The network device may identify the sender as the driver based on information from the text message indication and the multiple telematics packets. The network device may identify a sending time of the text message based on the text message indication and may identify one of the telematics packets with a time interval that corresponds to the sending time of the text message. The network device may identify, based on the telematics packet and the text message indication, that the vehicle was being operated and/or moving during the sending time of the text message and may log a texting-while-driving incident associated with the particular driver.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, in another implementation, message network 150 may associate a vehicle telematics unit with a particular message sender before notifying telematics service network 160. In another implementation, data samples from vehicle telematics unit 120 may be streamed in real time to service network 160 without being packaged in groups within a telematics packet.

In still another implementation, certain devices, such as notification server 152 or association server 162, may be configured to conserve computing resources by selectively notifying of close-in-time text messages and/or selectively inspecting driving data for close-in-time text messages. For example, association server 162 may decide not to inspect a data sample for a telematics packet when a data sample in the telematics packet has already been inspected for another text message or when a second text message is close-in-time (e.g., within 20 seconds) of a first text message.

Also, while a series of blocks has been described with respect to FIG. 7, the order of the blocks may be modified in other implementations. Further, non-dependent blocks may be performed in parallel. For example, in another implementation, association server 162 may log vehicle data associated with a MAC address and provide particular driver associations at a later time.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:
1. A method, comprising:
receiving, by a network device, an indication of a text message being sent from a sender using a mobile device;
receiving, by the network device, multiple telematics packets from a vehicle telematics unit, wherein each of the multiple telematics packets includes:
vehicle operating data from a vehicle, associated with a particular driver and for a particular time interval, and
a plurality of data samples for discrete time periods within a time interval for each of the telematics pack- ets, and wherein each of the data samples includes a sample time and information from which a speed of travel can be determined;

identifying, by the network device, the sender as the particular driver based on information from the indication of the text message;

identifying, by the network device, a sending time of the text message based on the indication of the text message;

identifying, by the network device, a telematics packet, of the multiple telematics packets, for a time interval that corresponds to the sending time of the text message;

identifying, by the network device and based on the telematics packet and the indication of the text message, that the vehicle was being operated during the sending time of the text message; and logging, by the network device, a texting-while-driving incident associated with the particular driver based on the identifying that the vehicle was being operated during the sending time of the text message.

2. The method of claim 1, further comprising:
receiving, by a different network device in a messaging network, the indication of the text message;
identifying, by the different network device, the sender as a registered participant of a texting alert service; and
forwarding, by the different network device and to the network device, the indication of the text message when the sender is a registered participant of the texting alert service.

3. The method of claim 1, further comprising:
sending an alert message to a registered contact, associated with the particular driver, based on the identifying that the vehicle was being operated during the sending time of the text message.

4. The method of claim 1, further comprising:
storing, in a telematics service network associated with the network device, the multiple telematics packets.

5. The method of claim 1, wherein identifying the sender as the particular driver includes:
matching a sender identifier included in the indication of the text message with a driver identifier included in the multiple telematics packets.

6. The method of claim 1, wherein identifying that the vehicle was being operated during the sending time of the text message includes:
inspecting a data sample, from the plurality of data samples, closest in time to the sending time of the text message; and
identifying, based on the information from which a speed of travel can be determined in the closest data sample, that the vehicle was moving at the time of the closest data sample.

7. The method of claim 6, wherein identifying that the vehicle was being operated during the sending time of the text message further includes:
identifying, one or more other data samples, from the plurality of data samples, near in time to the closest data sample; and
calculating movement of the vehicle based on the information from which a speed of travel can be determined in the closest data sample and the one or more other data samples.

8. The method of claim 1, further comprising:
receiving, by the network device, an indication of another text message being sent from the sender using the mobile device; and
deciding not to inspect a data sample, from the plurality of data samples, closest in time to the sending time of the other text message when a data sample in the telematics packet has already been inspected.

9. The method of claim 1, further comprising:
generating a report, for the particular driver, including a record of the texting-while-driving incident.

10. The method of claim 9, wherein the report is generated on a periodic basis, and wherein the report includes multiple texting-while-driving incidents.

11. A system, comprising:
a network device, in a telematics service network, configured to:
receive an indication of a text message being sent from a sender using a mobile device;
receive multiple telematics packets from a vehicle telematics unit, wherein each of the multiple telematics packets includes operating data from a vehicle, associated with a particular driver and for a particular time or time interval;
identify the sender as the particular driver based on information from the indication of the text message and the multiple telematics packets;
identify a sending time of the text message based on the indication of the text message;
identify a telematics packet, of the multiple telematics packets, for a time or time interval that corresponds to the sending time of the text message;
identify, within the telematics packet, associated with the particular driver, a particular sample of a group of samples that corresponds most closely to the sending time of the text message:,
determine, based on the particular sample, that the vehicle was moving at the sending time of the text message; and
log a texting-while-driving incident associated with the particular driver based on the identifying that the vehicle was being operated during the sending time of the text message.

12. The system of claim 11, further comprising:
another network device, in a message network, configured to:
receive the text message sent from the sender by the mobile device;
identify the sender as a registered participant of a texting alert service; and
forward, to the network device in the telematics service network, the indication of the text message when the sender is a registered participant of the texting alert service.

13. The system of claim 11, further comprising:
a vehicle telematics unit configured to:
identify the particular driver of the vehicle;
collect the operating data from the vehicle;
generate the multiple telematics packets to include the operating data for particular time intervals; and
associate the particular driver identifier with the multiple telematics packets.

14. The system of claim 11, further comprising:
a database, in a message network, to identify the mobile device or a sender identifier as a registered participant of a texting alert service.

15. The system of claim 11, further comprising:
an alert device configured to send an alert message to a registered contact, associated with the particular driver, based on the network device identifying that the vehicle was being operated during the sending time of the text message.

16. A non-transitory computer-readable medium containing instructions executable by at least one processor, the computer-readable medium comprising one or more instructions to:
- receive, from a network device in a message network, an indication of a text message being sent from a sender using a mobile device;
- receive at least one telematics packet from a vehicle telematics unit, wherein each of the at least one telematics packet includes operating data from a vehicle, associated with a particular driver and for a particular time interval;
- identify the sender as the particular driver based on information from the indication of the text message and the at least one telematics packet;
- identify a sending time of the text message based on the indication of the text message;
- identify a telematics packet, of the at least one telematics packet, for a time or time interval that corresponds to the sending time of the text message;
- identify, based on the identified telematics packet and the indication of the text message, that the vehicle was being operated during the sending time of the text message; and
- log a texting-while-driving incident associated with the particular driver based on the identifying that the vehicle was being operated during the sending time of the text message.

17. The non-transitory computer-readable medium of claim 16, further comprising one or more instructions to:
- send an alert message to a registered contact, associated with the particular driver, based on the identifying that the vehicle was being operated during the sending time of the text message.

18. The non-transitory computer-readable medium of claim 16, further comprising one or more instructions to:
- generate a report, for the particular driver, including a record of the texting-while-driving incident.

19. The non-transitory computer-readable medium of claim 16, wherein the one or more instructions to identify that the vehicle was being operated during the sending time of the text message further comprise one or more instructions to:
- identify, within the telematics packet, associated with the particular driver, a particular sample of a group of samples that corresponds most closely to the sending time of the text message; and
- determine, based on the particular sample, that the vehicle was moving at the sending time of the text message.

20. The non-transitory computer-readable medium of claim 16, wherein each of the multiple telematics packets include a plurality of data samples for discrete time periods within a time interval for the telematics packet, and wherein each of the data samples includes a sample time and information from which a speed of travel can be determined.

* * * * *